July 26, 1966 J. T. KUTNEY ETAL 3,262,269
THRUST REVERSER
Filed June 7, 1965 2 Sheets-Sheet 1
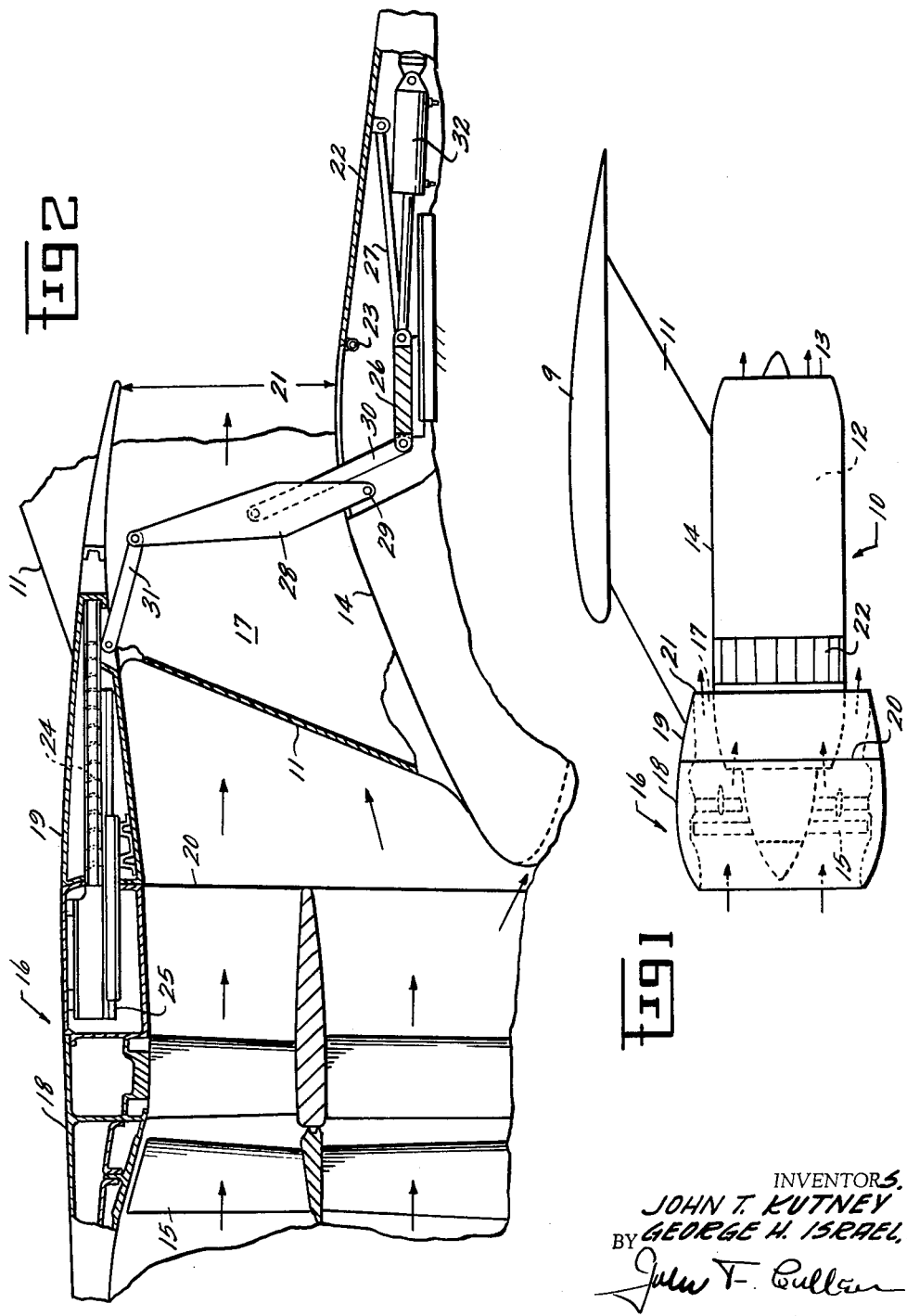
INVENTORS.
JOHN T. KUTNEY
BY GEORGE H. ISRAEL, JR.
ATTORNEY—

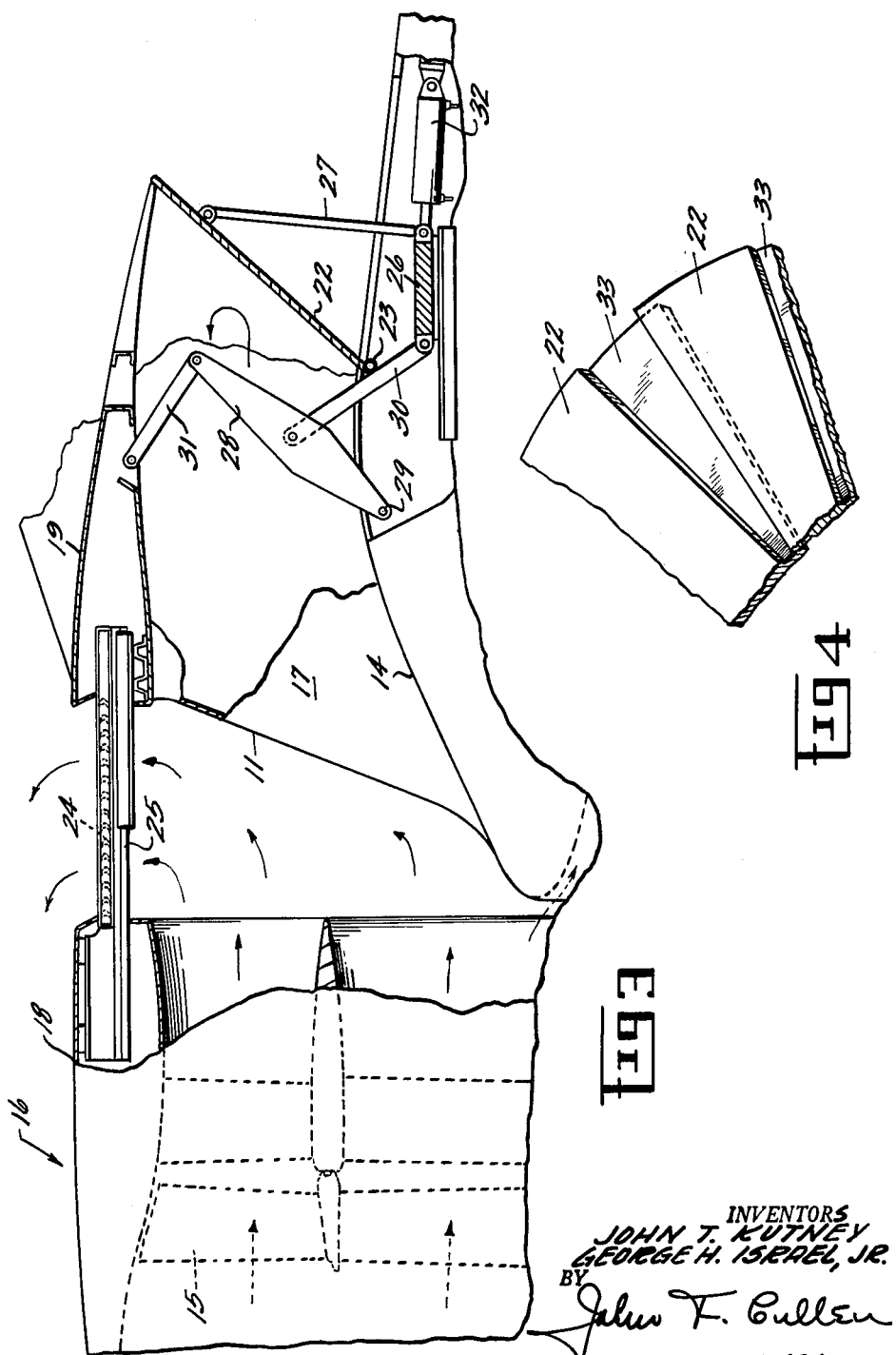

United States Patent Office 3,262,269
Patented July 26, 1966

3,262,269
THRUST REVERSER
John T. Kutney and George H. Israel, Jr., both of Cincinnati, Ohio, assignors to General Electric Company, a corporation of New York
Filed June 7, 1965, Ser. No. 462,791
10 Claims. (Cl. 60—35.54)

The present invention, a continuation-in-part of application Serial No. 391,619 filed August 24, 1964, now abandoned, relates to a thrust reverser mechanism and, more particularly, to a thrust reverser mechanism that is particularly applicable to bypass type fan engines.

With the advent of the fan engine, whether forward or aft fan, it has become necessary to supply thrust reverser mechanism to reverse the fluid flow through the generally annular cross-section of the bypass duct. Because the use of fans with conventional jet engines results in larger diameter engines or cruise fans, it is desired to provide reverser mechanism that does not add appreciably to an already large diameter when in the reversing position. Furthermore, because the engines become large and the reversing operation must be carried out on a relatively large periphery, it becomes important that the reversing structure be lightweight and straightforward and simple in operation. The high bypass ratio turbofan of about 4 to 1 and above, is a fan engine in which a vary large quantity of the propulsive fluid is sent through the annular bypass duct. In such engines, it may be possible to reverse only the bypass flow since the flow through the jet engine whether concentric or remote is a proportion as small as 10%–15% of the total flow. Reversing efficiently only the bypass flow in such high bypass ratio engines is sufficient to obtain the reversing necessary to meet specifications.

It is well understood that thrust reversers must perform two functions. They must stop the flow and they must turn the flow into the reverse position. It is desired to do this where there is as little disturbance or change as possible in the normal aerodynamic members that are required for other engine functions.

In most of the present type thrust reversers, the aircraft geometry has been compromised to reflect the physical mass of the reverser unit. As stated above, it is desired to provide a reverser that will fit the aircraft structure as it exists for other aerodynamic functions. It is also important that a thrust reverser supply good thrust modulation characteristics to provide for immediate and full thrust in the case of a wave-off or go-around condition during a landing operation. In other words, it is desirable that the engine be kept operating at its full thrust output and that the thrust reverser be such that it provides reverse thrust and can be immediately inactivated without he need for changing engine speed to resume acceleration. Furthermore, the thrust reverser should be fail-safe so that it will assume an inoperative and cruise position in the event of structural failure.

The main object of the present invention is to provide a thrust reverser that is applicable to high bypass ratio turbofan-engines and which splits the functions of the thrust reverser both functionally and structurally.

Another object is to provide such a reverser which maintains constant flow exhaust area from the bypass duct from forward cruise to full reverse and all modulated reverse in between.

A further object is to provide such a reverser which employs substantially the existing fan structure without compromising any of the aerodynamic characteristics desired for other functions.

A further object is to provide such a reverser in which a lightweight linkage mechanism, that is housed out of the flow and within a supporting strut, controllably interconnects the two functional structures so as to maintain the constant area and all of which is easily movable by a simple actuator.

Briefly stated, the invention is directed to use in a jet propulsion powerplant of the fan type having an inner wall and a fan concentric with the wall and extending radially beyond the wall. This may be an aft or a forward fan engine when the wall encloses an engine. A thrust reverser mechanism is provided which comprises a cowling surrounding the fan and spaced from the wall to form a bypass duct. The cowling is split into forward and aft abutting portions forming inner and outer flow surfaces when in cruise position. A fixed ring of flow reversing cascades is connected to the forward portion at the downstream end thereof and the aft portion telescopes over the fixed cascades so that they are inoperative during cruise. This is the reversing structure. The blocking structure comprises a plurality of peripherally disposed blocker flaps which are pivoted at their upstream ends to the wall for fail-safe operation. A separate actuating means controllably interconnects the flaps and the aft cowl portion to rotate the flaps into the duct and simultaneously translate the aft portion downstream to uncover the cascades, the actuating mechanism being so proportioned that it maintains constant flow exhaust area from the duct and reverses the duct flow. Additionally, a simple linkage structure and sealing mechanism is disclosed.

While the specification concludes with claims particularly pointing out and distinctly claiming the subject matter which is regarded as the invention it is believed the invention will be better understood from the following description taken in connection with the accompanying drawings in which:

FIG. 1 is a view partially in cross-section of a typical front fan powerplant supported from an aircraft wing and employing the instant invention;

FIG. 2 is an enlarged cross-sectional view in the area of the reverser showing the reversing mechanism in cruise position;

FIG. 3 is a view similar to FIG. 2 showing the mechanism moved into reverse thrust position; and FIG. 4 is a partial perspective view illustrating a sealing mechanism between individual blocker flaps.

It should be understood that the front fan high bypass ratio powerplant is described for illustration and the invention is equally applicable to aft fan powerplants as well as cruise fans. Also, the invention is described in connection with a front fan powerplant with a concentric jet engine wherein the fan nacelle does not extend completely back to the rear of the jet engine wall although the invention is equally applicable to such an installation.

High bypass ratio fans are those in which the ratio of the fluid passing through the fan to the jet engine is about 8 to 1 or above. In such installations it may be necessary to reverse only the fan flow for satisfactory performance and the jet engine exhaust may be ignored.

Referring first to FIG. 1, there is shown a front fan powerplant of the general type that might employ the instant invention. To this end, an aircraft structure such as wing 9 may support an engine generally indicated at 10 by means of conventional strut structure 11. Engine 10 may be of the front fan concentric type as shown in FIG. 1 and which employs an inner jet engine 12 discharging through a nozzle 13 to provide thrust. The jet engine is enclosed within a wall 14 in the conventional manner. While described in connection with a concentric fan jet engine it should be noted that wall 14 may be the wall of a plug in a pure cruise fan fed from a remote gas generator in a well known manner. For convenience of description, the concentric arrangement will be described. In order to provide additional thrust in the well known manner, a fan 15 concentric with the engine and extending radially beyond the wall 14 is provided. The fan 15 is surrounded by cowling 16 which is larger in diameter than the engine and spaced from the engine wall 14 to form a bypass duct 17 for additional thrust by movement of relatively large masses of lower velocity air in the well known manner. As explained above, in the high bypass ratio type powerplant this mass of air may be eight or greater times the amount of air flow through the engine 12. As shown, the fan air is used to propel fluid through the duct 17 as well as to supercharge the engine 12.

In order to provide a simplified and lightweight reverser for the fan structure and bypass flow, it is advantageous to make direct use of the cowling 16 as part of the reverser mechanism. At the same time it is desired that cowling 16 be kept as thin as possible for desired aerodynamic reasons. For this reason, and to avoid compromising the physical characteristics of the engine geometry, the present invention splits the reverser functionally and structurally. The two functions that a reverser must perform are (1) stopping the flow and (2) turning the flow. The present invention provides structure to perform both of these functions and splits the structure so that two separate but interconnected systems perform the two functions and still maintain the aerodynamic features of the engine substantially undisturbed.

Referring next to FIG. 2, it will be seen that cowling 16 is split peripherally around itself into a forward portion 18 and an aft portion 19. These portions may be generally seen in FIG. 1. Again, in FIG. 2, in the cruise position, the forward and aft portions 18 and 19 are substantially cylindrical and abut generally along line 20. It will be seen that both portions form the inner and outer flow surfaces in the cruise position of FIG. 2.

In order to reverse the flow through duct 17 it is necessary first to block the flow. To this end, the engine wall 14 is provided generally with a plurality of peripherally disposed blocker flaps 22 which are pivoted at their forward ends at 23 to wall 14. It is to be noted that the engine wall 14 and aft cowl portion 19 form a nozzle with throat 21 therebetween. In order to store flaps 22, a suitable depression is provided in the wall so that the flaps 22 are retractably nested to form a smooth wall surface in the cruise position as shown in FIG. 2. It will be apparent that these flaps 22 may be quite thin and thus easily actuated and form the smooth flow surface necessary in the FIG. 2 cruise position. Rotation of flaps 22 into duct 17 blocks the flow.

The second function of reversing the flow is obtained by means of a ring of flow reversing cascades 24 that are fixed to and extend aft from forward portion 18 as shown. It can be seen that these cascades, since they are fixed and do not move may be relatively thin and simple in construction and easily fit into a thin cowling structure 16. The reversing function is then performed by these cascades 24 which, in an installation as shown in FIG. 1, may preferably extend completely around the periphery although not limited to a complete peripheral arrangement. Since reversal is desired it is necessary that aft cowl portion 19 be designed to telescope over cascades 24 so that the cascades are nested or completely surrounded by the aft cowl 19. The cowl 19 must also be translated downstream to uncover the cascades. For this translation purpose, a minimum number of peripherally spaced track supports 25 are fixed to the forward portion 18 and extend aft from that portion. The aft cowl portion 19 may be carried on the track support means in any suitable manner so that the cowl 19 can telescope over and cover the cascades when it is in the abutting forward position as shown in FIG. 1.

Referring next to FIG. 3, the structure is shown in the reversing position. In this position it can be seen that blocker flaps 22 are extended out into the bypass duct 17 to block the flow and aft portion 19 has been translated downstream to uncover cascades 24 so that the flow is then reversed as shown by the arrows.

Because of potential wave-off and the consequent desire to fly the plane around again for another approach and the need for instant thrust, it is necessary that the reverser function in a fully modulated manner, i.e., the engine must run at full thrust position regardless of the reverser position and the reverser must be able to be actuated very rapidly so that it can be put into cruise position within approximately two seconds and make full thrust immediately obtainable. For this purpose then, it is desired to maintain a constant flow exhaust area from the bypass duct at all times from full cruise to full reverse thrust and all modulated positions therebetween. With this characteristic maintained, the engine, which wants to see a constant area exhaust at all times, may be run at full thrust even during landing. It is then up to operating speed and full thrust in the event of an emergency requiring a wave-off.

By suitably proportioning the actuating mechanism links and controllably interconnecting the flaps 22 and aft cowl portion 19 it is possible to maintain this constant flow exhaust area desired.

A typical lightweight and simplified actuating means that will perform this function is disclosed in FIGS. 2 and 3. This actuating means includes a translatable ring 26 that is disposed within the engine wall 14 and out of the flow. Ring 26 may be guided if necessary by any suitable means such as a track. Blocker flaps 22 are actuated by a first link 27 which connects the translatable ring 26 and the blocker flap 22 downstream of the blocker pivot 23 so the blocker flaps are fail-safe, i.e., will close on structural failure. The means interconnecting the blocker and aft cowl portion 19 includes a bellcrank 28 that is pivoted at 29 within the wall 14 and that extends for the most part within strut 11 which would be an airfoil shaped supporting strut. In order to move the interconnecting bellcrank 28, there is provided a second link 30 connected to the ring 26 and the link extends forward and is connected to the bellcrank 28 as shown. The aft cowl 19 is moved by a link connection 31 which is connected with bellcrank 28 in any suitable manner as shown. Thus, members 28, 30 and 31 may be substantially carried within the strut 11 and bellcrank 28 may be conveniently in the form of an H-shaped member for strength with links 30 and 31 connected therebetween to form a box-like structure which is strong enough to move the entire aft cowl 19 by this single structure and a single actuator. The actuating means is moved by an actuator 32 which is connected to the translatable ring 26 to move the ring downstream from the position shown in FIG. 2 to rotate the flaps 22 into the duct by means of link 27 as shown in FIG. 3. Simultaneously, bellcrank 28 is pivoted downstream by link 30 and moves the aft cowl portion 19 through link connection 31 so that as the flaps 22 are rotated the cascades 24 are simultaneously uncovered. These parts may be proportioned to maintain the constant area for the exhaust of the flow from the bypass duct in moving from the cruise position of FIG. 2 to the full reverse thrust position of FIG. 3 or modulated in-between positions.

Because of the peripheral arrangement of blocker flaps 22, it will be apparent that as they rotate into duct 17 they will tend to separate along their edges and form an opening therebetween. This must be sealed by any suitable sealing means as shown in a typical simplified version in FIG. 4. In this figure the flaps may be offset with steps 33 so that the outer portions of blockers 22 merely slide apart as they rotate into the bypass duct and the steps prevent an opening between blockers. Similarly, upon closing into the cruise position the overlapping parts merely slide together into the smooth flow surface position shown in FIG. 2.

It will be apparent that the thrust reverser herein disclosed provides for maintaining the cowling 16 thin and still permits the reversing function to be performed within the cowling which structure must be present for normal engine operation. Further, cascades 24 may be small and may be fixed. They are of simple lightweight and thin construction and perform only a reversing function. The blocking function performed by thin blockers 22 may be separated from the reversing function and conveniently and aerodynamically placed in the engine wall 14 as disclosed with suitable interconnecting and controlled actuating means between the two functions and structures so that constant area is always maintained.

While there have been described preferred forms of the invention, obvious modifications and variations are possible in light of the above teachings. It is therefore to be understood that within the scope of the appended claims, the invention may be practiced otherwise than as specifically described.

We claim:

1. In a jet propulsion powerplant of the fan type having an inner wall and a fan concentric therewith and extending radially beyond said wall, thrust reverser mechanism comprising,
   a cowling surrounding said fan and spaced from said wall to form a bypass duct,
   said cowling being split into forward and aft abutting portions forming inner and outer flow surfaces in cruise position,
   a fixed ring of flow reversing cascades disposed within said aft portion,
   a plurality of peripherally disposed blocker flaps pivoted at their upstream ends to said wall, and
   actuating means controllably interconnecting said flaps and aft cowl portion for rotating and extending said flaps into said duct and translating said aft portion downstream for uncovering said cascades and maintaining constant flow exhaust area from said duct and reversing the duct flow.

2. Apparatus as described in claim 1 wherein said cascades are fixed to said forward portion and track supporting means are provided for said aft portion to translate said aft portion over said cascades into abutting position.

3. Apparatus as described in claim 1 wherein strut means is provided connected to said wall for support from an aircraft and the interconnecting portion of said actuating means is in said strut.

4. Apparatus as described in claim 1 wherein said aft cowl portion and wall form a nozzle in the abutting position.

5. Apparatus as described in claim 1 wherein said blocker flaps have means thereon to seal between flaps in the extended position.

6. In a jet propulsion powerplant of the front fan high bypass ratio type having an inner wall and a fan concentric therewith and extending radially beyond said wall, thrust reverser mechanism comprising,
   a cowling surrounding said fan and spaced from said wall to form a bypass duct,
   said cowling being split into forward and aft abutting cylindrical portions forming inner and outer flow surfaces in cruise position,
   a ring of flow reversing cascades fixed to and extending aft from said forward portion,
   peripherally spaced track support means fixed to said forward portion and extending aft,
   said aft cowl portion carried on the track support means and telescoping over said cascades when abutting said forward portion,
   a plurality of peripherally disposed blocker flaps pivoted at their forward ends to said wall and nested therein to form a wall flow surface in cruise position, and
   actuating means controllably interconnecting said flaps and aft cowl portion for rotating and extending said flaps into said duct and simultaneously translating said aft portion downstream for uncovering said cascades and maintaining constant flow exhaust area from said duct and reversing the duct flow.

7. Apparatus as described in claim 6 wherein strut means is provided connected to said wall for support from an aircraft and the interconnecting portion of said actuating means is in said strut.

8. Apparatus as described in claim 6 wherein said aft cowl portion and wall form a nozzle in the abutting position.

9. Apparatus as described in claim 6 wherein said blocker flaps have means thereon to seal between flaps in the extended position.

10. Apparatus as described in claim 7 wherein said actuating means includes a translatable ring within said engine wall, a first link connecting said translatable ring and blocker flap downstream of said blocker pivot, bellcrank means pivoted within said wall and extending into said strut, a second link connected to said translatable ring and extending forward and connected to said bellcrank, said bellcrank being link-connected with said aft cowl portion, and an actuator connected to said translatable ring to move said ring downstream and thus rotate said flaps into the duct by said first link, pivot said bellcrank downstream by said second link and translate said aft cowl portion by said bellcrank link connection, said parts being proportioned to rotate said flaps and uncover said cascades and simultaneously maintain a constant area for exhaust of flow from the by-pass duct in moving from cruise to full reverse thrust position.

References Cited by the Examiner

UNITED STATES PATENTS

| | | |
|---|---|---|
| 2,847,823 | 8/1958 | Brewer. |
| 2,938,335 | 5/1960 | Cook _____ 60—35.54 |
| 2,950,595 | 8/1960 | Laucher et al. _____ 60—35.54 |
| 3,034,296 | 5/1962 | Keen et al. _____ 60—35.54 |
| 3,036,431 | 5/1962 | Vdolek _____ 60—35.54 |
| 3,068,646 | 12/1962 | Fletcher _____ 60—35.54 X |
| 3,113,428 | 12/1963 | Colley et al _____ 60—35 X |

MARK NEWMAN, *Primary Examiner.*

C. R. CROYLE, *Assistant Examiner.*